United States Patent
Belgaied et al.

(10) Patent No.: US 8,194,667 B2
(45) Date of Patent: Jun. 5, 2012

(54) METHOD AND SYSTEM FOR INHERITANCE OF NETWORK INTERFACE CARD CAPABILITIES

(75) Inventors: Kais Belgaied, Sunnyvale, CA (US); Darrin P. Johnson, Mountain View, CA (US)

(73) Assignee: Oracle America, Inc., Redwood City, CA (US)

( * ) Notice: Subject to any disclaimer, the term of this patent is extended or adjusted under 35 U.S.C. 154(b) by 792 days.

(21) Appl. No.: 11/731,458

(22) Filed: Mar. 30, 2007

(65) Prior Publication Data

US 2008/0240142 A1    Oct. 2, 2008

(51) Int. Cl.
*H04L 12/28* (2006.01)
*H04L 12/56* (2006.01)

(52) U.S. Cl. .................. 370/392; 370/412

(58) Field of Classification Search .......... None
See application file for complete search history.

(56) References Cited

U.S. PATENT DOCUMENTS

| | | | |
|---|---|---|---|
| 6,041,053 A | 3/2000 | Douceur et al. | |
| 6,070,219 A | 5/2000 | McAlpine et al. | |
| 6,163,539 A | 12/2000 | Alexander et al. | |
| 6,477,643 B1 | 11/2002 | Vorbach et al. | |
| 6,600,721 B2 | 7/2003 | Edholm | |
| 6,714,960 B1 | 3/2004 | Bitar et al. | |
| 6,757,731 B1 | 6/2004 | Barnes et al. | |
| 6,831,893 B1 | 12/2004 | Ben Nun et al. | |
| 6,859,841 B2 | 2/2005 | Narad et al. | |
| 6,941,377 B1 * | 9/2005 | Diamant et al. | 709/230 |
| 6,944,168 B2 | 9/2005 | Paatela et al. | |
| 7,046,665 B1 | 5/2006 | Walrand et al. | |
| 7,177,311 B1 | 2/2007 | Hussain et al. | |
| 7,260,102 B2 | 8/2007 | Mehrvar et al. | |
| 7,313,142 B2 | 12/2007 | Matsuo et al. | |
| 2003/0037154 A1 | 2/2003 | Poggio et al. | |
| 2003/0065676 A1 * | 4/2003 | Gbadegesin et al. | 707/104.1 |
| 2004/0267866 A1 | 12/2004 | Carollo et al. | |
| 2005/0111455 A1 | 5/2005 | Nozue et al. | |
| 2005/0135243 A1 | 6/2005 | Lee et al. | |
| 2005/0138620 A1 | 6/2005 | Lewites | |
| 2006/0041667 A1 | 2/2006 | Ahn et al. | |
| 2006/0045089 A1 | 3/2006 | Bacher et al. | |
| 2006/0070066 A1 | 3/2006 | Grobman | |
| 2006/0174324 A1 | 8/2006 | Zur et al. | |
| 2006/0209718 A1 * | 9/2006 | Kinsey et al. | 370/254 |
| 2006/0248191 A1 * | 11/2006 | Hudson et al. | 709/226 |

OTHER PUBLICATIONS

Tripathi, S.; "Solaris Networking—The Magic Revealed (Part I)"; Sunay Tripathi's Solaris Networking Weblog; Nov. 14, 2005, pp. 1-22 (22 pages).

Dovrolis, C., Thayer, B. and Ramanathan, P.: "HIP: Hybrid Interrupt—Polling for the Network Interface", ACM SIGOPS Operating Systems Review, col. 35, Iss. 4, Oct. 2001, (11 Pages).

* cited by examiner

*Primary Examiner* — Jae Y Lee
(74) *Attorney, Agent, or Firm* — Osha • Liang LLP

(57) ABSTRACT

A method for obtaining a capability from a network interface card (NIC), involving sending a query to the NIC for the capability, obtaining the capability from the NIC in response to the query, sending the capability to a virtual NIC, and sending the capability from the virtual NIC to a virtual network stack associated with the virtual NIC, wherein the capability is used by the virtual network stack to process packets.

20 Claims, 6 Drawing Sheets

METHOD AND SYSTEM FOR INHERITANCE OF NETWORK INTERFACE CARD CAPABILITIES

CROSS-REFERENCE TO RELATED APPLICATIONS

The present application contains subject matter that may be related to the subject matter in the following U.S. applications filed on Apr. 22, 2005, and assigned to the assignee of the present application: "Method and Apparatus for Managing and Accounting for Bandwidth Utilization Within A Computing System" with U.S. application Ser. No. 11/112,367; "Method and Apparatus for Consolidating Available Computing Resources on Different Computing Devices" with U.S. application Ser. No. 11/112,368; "Assigning Higher Priority to Transactions Based on Subscription Level" with U.S. application Ser. No. 11/112,947; "Method and Apparatus for Dynamically Isolating Affected Services Under Denial of Service Attack" with U.S. application Ser. No. 11/112,158; "Method and Apparatus for Improving User Experience for Legitimate Traffic of a Service Impacted by Denial of Service Attack" with U.S. application Ser. No. 11/112,629; "Method and Apparatus for Limiting Denial of Service Attack by Limiting Traffic for Hosts" with U.S. application Ser. No. 11/112,328; "Hardware-Based Network Interface Per-Ring Resource Accounting" with U.S. application Ser. No. 11/112,222; "Dynamic Hardware Classification Engine Updating for a Network Interface" with U.S. application Ser. No. 11/112,934; "Network Interface Card Resource Mapping to Virtual Network Interface Cards" with U.S. application Ser. No. 11/112,063; "Network Interface Decryption and Classification Technique" with U.S. application Ser. No. 11/112,436; "Method and Apparatus for Enforcing Resource Utilization of a Container" with U.S. application Ser. No. 11/112,910; "Method and Apparatus for Enforcing Packet Destination Specific Priority Using Threads" with U.S. application Ser. No. 11/112,584; "Method and Apparatus for Processing Network Traffic Associated with Specific Protocols" with U.S. application Ser. No. 11/112,228.

The present application contains subject matter that may be related to the subject matter in the following U.S. applications filed on Oct. 21, 2005, and assigned to the assignee of the present application: "Method and Apparatus for Defending Against Denial of Service Attacks" with U.S. application Ser. No. 11/255,366; "Router Based Defense Against Denial of Service Attacks Using Dynamic Feedback from Attacked Host" with U.S. application Ser. No. 11/256,254; and "Method and Apparatus for Monitoring Packets at High Data Rates" with U.S. application Ser. No. 11/226,790.

The present application contains subject matter that may be related to the subject matter in the following U.S. applications filed on Jun. 30, 2006, and assigned to the assignee of the present application: "Network Interface Card Virtualization Based On Hardware Resources and Software Rings" with U.S. Pat. No. 7,672,299; "Method and System for Controlling Virtual Machine Bandwidth" with U.S. Pat. No. 7,613,132; "Virtual Switch" with U.S. Pat. No. 7,643,482; "System and Method for Virtual Network Interface Cards Based on Internet Protocol Addresses" with U.S. Pat. No. 7,684,423; "Virtual Network Interface Card Loopback Fastpath" with U.S. Pat. No. 7,630,368; "Bridging Network Components" with U.S. Pat. No. 7,634,608; "Reflecting the Bandwidth Assigned to a Virtual Network Interface Card Through Its Link Speed" with U.S. Pat. No. 7,792,140; "Method and Apparatus for Containing a Denial of Service Attack Using Hardware Resources on a Virtual Network Interface Card" with U.S. Pat. No. 7,966,401; "Virtual Network Interface Cards with VLAN Functionality" with U.S. Pat. No. 7,742,474; "Method and Apparatus for Dynamic Assignment of Network Interface Card Resources" with U.S. Pat. No. 7,613,198; "Generalized Serialization Queue Framework for Protocol Processing" with U.S. Pat. No. 7,983,266; "Serialization Queue Framework for Transmitting Packets" with U.S. Pat. No. 8,149,709.

The present application contains subject matter that may be related to the subject matter in the following U.S. applications filed on Jul. 20, 2006, and assigned to the assignee of the present application: "Low Impact Network Debugging" with U.S. Pat. No. 8,050,266; "Reflecting Bandwidth and Priority in Network Attached Storage I/O" with U.S. Pat. No. 7,836,212; "Priority and Bandwidth Specification at Mount Time of NAS Device Volume" with U.S. Pat. No. 8,095,675; "Notifying Network Applications of Receive Overflow Conditions" with U.S. Pat. No. 8,036,127; "Host Operating System Bypass for Packets Destined for a Virtual Machine" with U.S. Pat. No. 8,005,022; "Multi-Level Packet Classification" with U.S. Pat. No. 7,848,331; "Method and System for Automatically Reflecting Hardware Resource Allocation Modifications" with U.S. Pat. No. 7,788,411; "Multiple Virtual Network Stack Instances Using Virtual Network Interface Cards" with U.S. Pat. No. 7,885,257; "Method and System for Network Configuration for Containers" with U.S. Pat. No. 7,912,926 "Network Memory Pools for Packet Destinations and Virtual Machines" with U.S. application Ser. No. 11/490,486; "Method and System for Network Configuration for Virtual Machines" with U.S. application Ser. No. 11/489,923; and "Shared and Separate Network Stack Instances" with U.S. application Ser. No. 11/489,933.

The present application contains subject matter that may be related to the subject matter in the following U.S. applications filed on Nov. 28, 2006, and assigned to the assignee of the present application: "Virtual Network Testing and Deployment using Network Stack Instances and Containers" with U.S. Pat. No. 7,733,795 and "Method and System for Creating A Demilitarized Zone using Network Stack Instances" with U.S. Pat. No. 7,633,864 filed on Dec. 20, 2006.

The present application contains subject matter that may be related to the subject matter in the following U.S. application filed on Dec. 20, 2006, and assigned to the assignee of the present application: "Network Stack Instance Architecture with Selection of Transport Layers" with U.S. application Ser. No. 11/642,490; "Method and System for Virtual Routing Using Containers" with U.S. application Ser. No. 11/642,756.

The present application contains subject matter that may be related to the subject matter in the following U.S. applications filed on Mar. 31, 2007, and assigned to the assignee of the present application: "Method and System for Security protocol algorithm Partitioning and Virtualization" with U.S. application Ser. No. 11/731,601; "Method and System for Virtualization of Packet Encryption Offload and Onload" with U.S. application Ser. No. 11/789,337; "Combined Security protocol algorithm and Packet Filter Offload and Onload" with U.S. Pat. No. 8,006,297.

BACKGROUND

Network traffic is transmitted over a network, such as the Internet, from a sending system (e.g., a computer system) to a receiving system (e.g., a computer system) via a physical network interface card (NIC). The physical NIC is a piece of hardware found in a typical computer system that includes functionality to send and receive network traffic. Typically, network traffic is transmitted in the form of packets, where each packet includes a header and a payload. The header includes information regarding the source address, destination address, size, transport protocol used to transmit the packet, and various other identification information associated with the packet. The payload includes the actual data to be transmitted from the network to the receiving system.

Typically, the physical NIC includes various capabilities, which are used to process the received packets. The following are some examples of capabilities the physical NIC may include: maximum bandwidth the physical NIC can support and cryptographic off-loading functionality. The capabilities of the physical NIC are typically exposed to the host via a device driver. The host or, more specifically, a process executing thereon, may use one or more of exposed capabilities. Further, if multiple processes executing on the host use the physical NIC, then all of the capabilities are exposed to all of the processes.

SUMMARY

In general, in one aspect, the invention relates to a method for obtaining a capability from a network interface card (NIC), comprising sending a query to the NIC for the capability, obtaining the capability from the NIC in response to the query, sending the capability to a virtual NIC, and sending the capability from the virtual NIC to a virtual network stack associated with the virtual NIC, wherein the capability is used by the virtual network stack to process packets.

In general, in one aspect, the invention relates to a system for processing packets, comprising a network interface card (NIC) comprising a plurality of capabilities, a host operatively connected to the NIC using a NIC driver, comprising a first virtual NIC, wherein the first virtual NIC receives a first subset of the plurality of capabilities from the NIC using the NIC driver and a first virtual network stack operatively connected to the first virtual NIC, wherein the first virtual network stack receives the first subset of the plurality of capabilities from the first virtual NIC, wherein the first subset of the plurality of capabilities is configured in the first virtual NIC, and wherein the first virtual network stack uses at least one of the first subset of the plurality of capabilities to process packets received by the host.

In general, in one aspect, the invention relates to a computer readable medium containing software instructions embodied therein for causing a computer system to perform a method for obtaining a capability from a network interface card (NIC), the method comprising sending a query to the NIC for the capability, obtaining the capability from the NIC in response to the query, sending the capability to a virtual NIC, sending the capability from the virtual NIC to a virtual network stack associated with the virtual NIC, and configuring the capability in the virtual NIC, wherein the capability is used by the virtual network stack to process packets.

Other aspects of the invention will be apparent from the following description and the appended claims.

DETAILED DESCRIPTION

Figure 1:
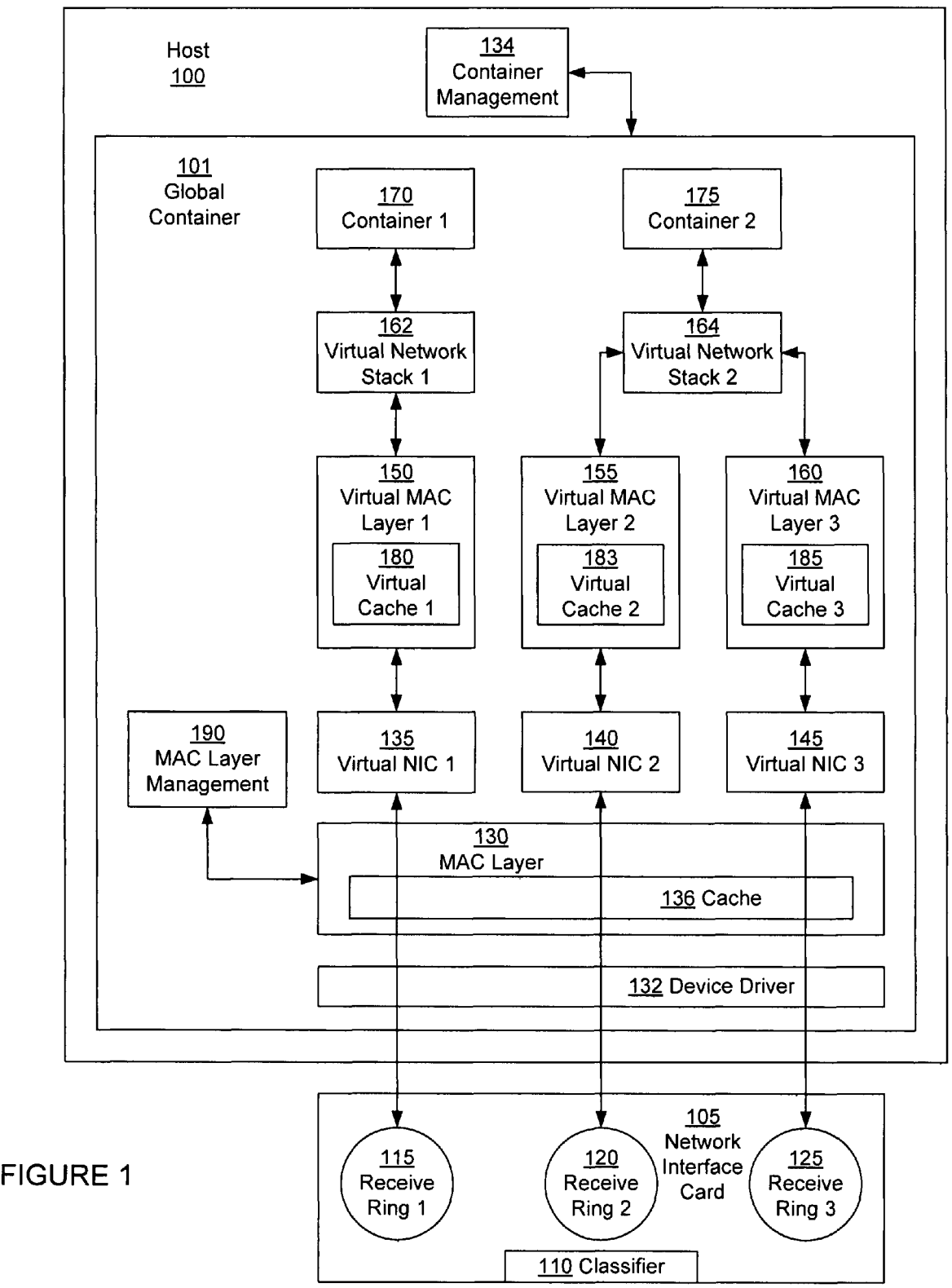
FIG. 1 shows a schematic diagram of a system in accordance with one or more embodiments of the invention.

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

In general, embodiments of the invention provide a method and system to process packets using capabilities available on a physical network interface card (NIC). In one embodiment of the invention, the capabilities may include, but are not limited to, a hardware offloading capability, a cryptographic offloading capability, a transport protocol offload engine, an extensible markup language (XML) parser, a security protocol algorithm (e.g., IPSec), a large send offloading (LSO) capability, a large receive offload (LRO) capability, and a hardware checksum capability.

Specifically, embodiments of the invention provide a method and system to allocate physical NIC capabilities among multiple virtual NICs. In one embodiment of the invention, each virtual NIC may correspond to a container, which sends and receives packets from the physical NIC. Further, the virtual NICs may inherit the capabilities of the physical NIC by obtaining the capabilities from the NIC driver. In addition, the capabilities may be configured and allocated further at the virtual NIC level using access policies. Once the virtual NICs are configured using the capabilities, the capabilities may be used by the virtual NICs (and/or associated virtual network stacks) to process incoming and outgoing packets.

FIG. 1 shows a schematic diagram of a system in accordance with one or more embodiments of the invention. As shown in FIG. 1, the system includes a host (100), a network interface card (NIC) (105), a Media Access Control (MAC) layer (130), a MAC layer management module (190), multiple virtual MAC layers (e.g., virtual MAC layer 1 (150), virtual MAC layer 2 (155), virtual MAC layer 3 (160)), multiple virtual network stacks (e.g., virtual network stack 1 (162), virtual network stack 2 (164)), multiple virtual NICs (e.g., virtual NIC 1 (135), virtual NIC 2 (140), virtual NIC 3 (145)), multiple containers (e.g., container 1 (170), container 2 (175), and a container management module (134). Each of these components is described below.

In one embodiment of the invention, the NIC (105) provides an interface between the host (100) and a network (not shown) (e.g., a local area network, a wide area network, a wireless network, etc.). More specifically, the NIC (105) includes a network interface (NI) (i.e., the hardware on the NIC) used to interface with the network. For example, the NI may correspond to an RJ-45 connector, a wireless antenna, etc. Upon receipt of the packets by the NI, the NI sends the packets to other components on the NIC (105) for processing. In one embodiment of the invention, the NIC (105) includes one or more receive rings (e.g., receive ring 1 (115), receive ring 2 (120), receive ring 3 (125)). In one embodiment of the invention, the receive rings (e.g., receive ring 1 (115), receive ring 2 (120), receive ring 3 (125)) correspond to portions of memory within the NIC (105) used to temporarily store packets received from the network. In one embodiment of the invention, the classifier (110) is configured to analyze the incoming network traffic, typically in the form of packets, received from the network (not shown).

In one embodiment of the invention, analyzing individual packets includes determining to which of the receive rings (e.g., receive ring 1 (115), receive ring 2 (120), receive ring 3 (125)) each packet is forwarded. In one embodiment of the invention, analyzing the packets by the classifier (110) includes analyzing one or more fields in each of the packets to determine to which of the receive rings (e.g., receive ring 1 (115), receive ring 2 (120), receive ring 3 (125)) the packets are forwarded. As an alternative, the classifier (110) may use the contents of one or more fields in each packet as an index into a data structure that includes information necessary to determine to which receive ring (e.g., receive ring 1 (115), receive ring 2 (120), receive ring 3 (125)) that packet is forwarded. The classifier (110) may also use other data found in the packet, such as the destination MAC address, to classify the packet. In one embodiment of the invention, the classifier (110) may be implemented by a separate microprocessor embedded on the NIC (105). Alternatively, the classifier (110) may be implemented in software stored in memory (e.g., firmware, etc.) on the NIC (105) and executed by a microprocessor on the NIC (105).

In one or more embodiments of the invention, the host (100) may include a device driver (132) and one or more virtual NICs (e.g., virtual NIC 1 (135), virtual NIC 2 (140), virtual NIC 3 (145)). In one embodiment of the invention, the device driver (132) provides an interface between the receive rings (e.g., receive ring 1 (115), receive ring 2 (120), receive ring 3 (125)) and the host (100). More specifically, the device driver (132) exposes the receive rings (e.g., receive ring 1 (115), receive ring 2 (120), receive ring 3 (125)) to the host (100). In one embodiment of the invention, each of the virtual NICs (e.g., virtual NIC 1 (135), virtual NIC 2 (140), virtual NIC 3 (145)) is associated with one or more receive rings (e.g., receive ring 1 (115), receive ring 2 (120), receive ring 3 (125)). In other words, a virtual NIC (e.g., virtual NIC 1 (135), virtual NIC 2 (140), virtual NIC 3 (145)) receives incoming packets from a corresponding receive ring(s) (e.g., receive ring 1 (115), receive ring 2 (120), receive ring 3 (125)). In one or more embodiments of the invention, outgoing packets are forwarded from a virtual NIC (e.g., virtual NIC 1 (135), virtual NIC 2 (140), virtual NIC 3 (145)) to a corresponding transmit ring (not shown), which temporarily stores the packet before transmitting the packet over the network. In one or more embodiments of the invention, receive rings (e.g., virtual NIC 1 (135), virtual NIC 2 (140), virtual NIC 3 (145)) and transmit rings (not shown) are implemented as ring buffers in the NIC (105).

In one or more embodiments of the invention, the virtual NICs (e.g., virtual NIC 1 (135), virtual NIC 2 (140), virtual NIC 3 (145)) are operatively connected to containers (e.g., container 1 (170), container 2 (175)) via virtual network stacks (e.g., virtual network stack (162), virtual network stack 2 (164)). The virtual NICs (e.g., virtual NIC 1 (135), virtual NIC 2 (140), virtual NIC 3 (145)) provide an abstraction layer between the NIC (105) and the containers (e.g., container 1 (170), container 2 (175)) on the host (100). More specifically, each virtual NIC (e.g., virtual NIC 1 (135), virtual NIC 2 (140), virtual NIC 3 (145)) operates like a NIC (105). In other words, to all components above the virtual NIC (e.g., containers, virtual MAC layers, virtual network stacks, etc.) the virtual NIC appears as a physical NIC. In one embodiment of the invention, each virtual NIC (e.g., virtual NIC 1 (135), virtual NIC 2 (140), virtual NIC 3 (145)) is associated with one or more Internet Protocol (IP) addresses, associated with one or more MAC addresses, optionally associated with one or more ports, and optionally configured to handle one or more protocol types. As a result, containers (e.g., container 1 (170), container 2 (175)) on the host (100) are unable to distinguish a virtual NIC (e.g., virtual NIC 1 (135), virtual NIC 2 (140), virtual NIC 3 (145)) from a physical NIC (105).

In one or more embodiments of the invention, the virtual NICs (e.g., virtual NIC 1 (135), virtual NIC 2 (140), virtual NIC 3 (145)) are associated with a MAC layer (130). In one embodiment of the invention, the MAC layer (130) includes functionality to move data packets between the NIC (105) and virtual NICs, as well as between other NICs on other hosts, using MAC protocols (e.g., Address Resolution Protocol (ARP), Carrier Sense Multiple Access with Collision Detection (CSMA/CD). The MAC layer (130) may also include functionality to ensure that collisions do not occur when signals are sent from multiple devices, such as NICs and virtual NICs, at the same time. In addition, the virtual NICs (e.g., virtual NIC 1 (135), virtual NIC 2 (140), virtual NIC 3 (145)) may implement a MAC layer configuration, such as a virtual LAN, Virtual Private Network tunnel, etc. MAC layer (130) protocols may be regulated and configured by a MAC layer management module (190).

In addition, each virtual NIC (e.g., virtual NIC 1 (135), virtual NIC 2 (140), virtual NIC 3 (145)) is associated with a virtual MAC layer (e.g., virtual MAC layer 1 (150), virtual MAC layer 2 (155), virtual MAC layer 3 (160)). In one or more embodiments of the invention, each virtual MAC layer (e.g., virtual MAC layer 1 (150), virtual MAC layer 2 (155), virtual MAC layer 3 (160)) manages MAC layer processing of packets within the virtual NICs (e.g., virtual NIC 1 (135), virtual NIC 2 (140), virtual NIC 3 (145)).

In one or more embodiments of the invention, each virtual network stack (e.g., virtual network stack (162), virtual network stack 2 (164)) includes functionality to process packets in accordance with various protocols used to send and receive packets (e.g., Transmission Communication Protocol (TCP), Internet Protocol (IP), User Datagram Protocol (UDP), etc.). Further, each virtual network stack may also include functionality, as needed, to perform additional processing on the incoming and outgoing packets. This additional processing may include, but is not limited to, cryptographic processing, firewall routing, etc.

In one or more embodiments of the invention, the virtual network stacks (e.g., virtual network stack (162), virtual network stack 2 (164)) correspond to network stacks with network layer and transport layer functionality. In one embodiment of the invention, network layer functionality corresponds to functionality to manage packet addressing and delivery on a network (e.g., functionality to support IP, Address Resolution Protocol (ARP), Internet Control Message Protocol, etc.). In one embodiment of the invention, transport layer functionality corresponds to functionality to manage the transfer of packets on the network (e.g., functionality to support TCP, UDP, Stream Control Transmission Protocol (SCTP), etc.). In one or more embodiments of the invention, the virtual network stacks (e.g., virtual network stack (162), virtual network stack 2 (164)) implement an IP layer (not shown) and a TCP layer (not shown). The virtual network stack is explained in greater detail in FIG. 2.

As shown in FIG. 1, the host (100) includes a global container (101) and a number of non-global containers (e.g., container 1 (170), container 2 (175)). The global container (101) corresponds to an isolated execution environment within the host (100). Further, each non-global container (e.g., container 1 (170), container 2 (175)) corresponds to an isolated execution environment within the global container (101). All of the containers (global and non-global) share a common kernel, and as a result, execute the same operating system. While all of the containers share a common kernel, the non-global containers (e.g., container 1 (170), container 2 (175)) are configured such that processes executing in a given non-global container are restricted to execute in the non-global container and have no access to resources not assigned to the non-global container. The isolated execution environments of each non-global container (e.g., container 1 (170), container 2 (175)) as well as the global container (101) are managed by a container management component (134) executing on the host (100). The container management component (134) typically executes outside of the global container (101). An example of a container is a Solaris™ Container. (Solaris is a trademark of Sun Microsystems, Inc. of California, USA).

Each of the non-global containers (e.g., container 1 (170), container 2 (175)) is configured to send and receive packets to and from the NIC (105). The virtual network stacks (e.g., virtual network stack (162), virtual network stack 2 (164)) connected to the non-global containers (e.g., container 1 (170), container 2 (175)) process outgoing packets before transmitting the packets to other containers or hosts; the virtual network stacks also process incoming packets from other sources before sending the packets to the containers. In one or more embodiments of the invention, each non-global container (e.g., container 1 (170), container 2 (175)) and the global container (101) is identified by a container ID, which uniquely identifies the container in the host (100).

In one or more embodiments of the invention, the NIC (105) is associated with one or more capabilities. These capabilities may include, but are not limited to, a hardware offloading capability, a cryptographic offloading capability, a transport protocol offload engine, an extensible markup language (XML) parser, a security protocol algorithm (e.g., IPSec, secure sockets layer (SSL), etc.), a large send offload (LSO) capability, a large receive offload (LRO) capability, and a hardware checksum capability. The capabilities may be implemented on hardware residing on the NIC (105). In addition, the capabilities may be used by the NIC (105) to process incoming and outgoing packets. In one or more embodiments of the invention, using one or more capabilities of the NIC (105) to process packets accelerates the overall processing of the packets by offloading the capabilities from the host (100) to the NIC (105). Capabilities provided by the NIC (105) may be communicated to the host (100) by the device driver (132). In addition, the capabilities may be stored in a MAC layer (130) cache (136) on the host (100) for use by the host (100).

Further, the capabilities may be communicated to and used by the virtual NICs (e.g., virtual NIC 1 (135), virtual NIC 2 (140), virtual NIC 3 (145)). In one or more embodiments of the invention, NIC (105) capabilities are used to process packets sent from and received by containers (e.g., container 1 (170), container 2 (175)) on the host (100). In addition, NIC (105) capabilities may be selected and configured to process packets associated with individual containers (e.g., container 1 (170), container 2 (175)). The capabilities may be obtained by virtual NICs (e.g., virtual NIC 1 (135), virtual NIC 2 (140), virtual NIC 3 (145)) and stored in virtual caches (e.g., virtual cache 1 (180), virtual cache 2 (183), virtual cache 3 (185)) corresponding to the virtual NICs.

Specifically, NIC (105) capabilities may be communicated to a virtual NIC (e.g., virtual NIC 1 (135), virtual NIC 2 (140), virtual NIC 3 (145)) by accessing the MAC layer (130) cache (136). The capabilities may then be selected and configured for the virtual NIC (e.g., virtual NIC 1 (135), virtual NIC 2 (140), virtual NIC 3 (145)) using an access policy, and stored in the virtual cache (e.g., virtual cache 1 (180), virtual cache 2 (183), virtual cache 3 (185)) corresponding to the virtual NIC for use in processing packets associated with the virtual NIC.

In one or more embodiments of the invention, NIC (105) capabilities available to the host (100) are governed by a global access policy. The global access policy may be enforced by the global container (101). The global access policy may also dictate the NIC (105) capabilities that are available to the host (100). For example, each capability may be associated with a boolean value indicating the status, or state, of the capability; a value of 0 may correspond to a status of "off" or an "off state", whereas a value of 1 may correspond to a status of "on" or an "on state." Further, each capability may be associated with a set of modes of operation. For example, the NIC (105) may be associated with several link speeds: auto negotiate, 100 Mb/s full duplex, 100 Mb/s half duplex, 100baseT4, 10 Mb/s full duplex, and 10 MB/s half duplex. The global access policy may dictate a link speed of 10 Mb/s full duplex. As a result, the mode corresponding to 10 Mb/s full duplex may be set to a value of 1, whereas all other modes (i.e., 100 Mb/s full duplex, 100 Mb/s half duplex, 100baseT4, 10 MB/s half duplex) may be set to a value of 0.

In addition, NIC (105) capabilities for virtual NICs (e.g., virtual NIC 1 (135), virtual NIC 2 (140), virtual NIC 3 (145)) may be governed by one or more local access policies. The local access policies may be enforced by the non-global containers (e.g., container 1 (170), container 2 (175)). In one or more embodiments of the invention, the local access policies dictate a subset of the NIC (105) capabilities that are available to the virtual NICs (e.g., virtual NIC 1 (135), virtual NIC 2 (140), virtual NIC 3 (145)). The local access policies may further allocate the capabilities among the virtual NICs (e.g., virtual NIC 1 (135), virtual NIC 2 (140), virtual NIC 3 (145)). For example, a link speed of 10 Mb/s may be divided among three virtual NICs (e.g., virtual NIC 1 (135), virtual NIC 2 (140), virtual NIC 3 (145)) according to a local access policy. The local access policy may allocate a link speed of 5 Mb/s to one virtual NIC (e.g., virtual NIC 1 (135), virtual NIC 2 (140), virtual NIC 3 (145)), 3 Mb/s to another, and 2 Mb/s to the third virtual NIC.

In one or more embodiments of the invention, local access policies allocate capabilities to virtual NICs (e.g., virtual NIC 1 (135), virtual NIC 2 (140), virtual NIC 3 (145)) based on priority. For example, a large amount of cryptographic offload capability may be allocated to a virtual NIC (e.g., virtual NIC 1 (135), virtual NIC 2 (140), virtual NIC 3 (145)) corresponding to a container (e.g., container 1 (170), container 2 (175)) that requires a large amount of packet encryption and decryption, whereas little to no cryptographic offload capability may be allocated to containers requiring small amounts of packet encryption. Those skilled in the art will appreciate that the global and local access policies may also be arbitrarily defined (e.g., by an administrator). Those skilled in the art will also appreciate that a default global access policy and/or local access policy may exist for the system of FIG. 1. The default policy or policies may then be updated to reflect new policies as virtual NICs and containers are created.

Further, in one embodiment of the invention, the global access policy includes heuristics to optimize the overall packet processing of the host. The aforementioned heuristics may use as inputs the configuration of each of the virtual NICs. The global access policy may then determine how to modify their respective configurations such that the overall packet processing on the host is optimized. In one embodiment of the invention, optimization of packet processing may be measured using number of packets processed by the host per unit of time (e.g., second). In one embodiment of the invention, the aforementioned global access policy may override the local access policies with respect to the configuration of one or more virtual NICs.

Figure 2:
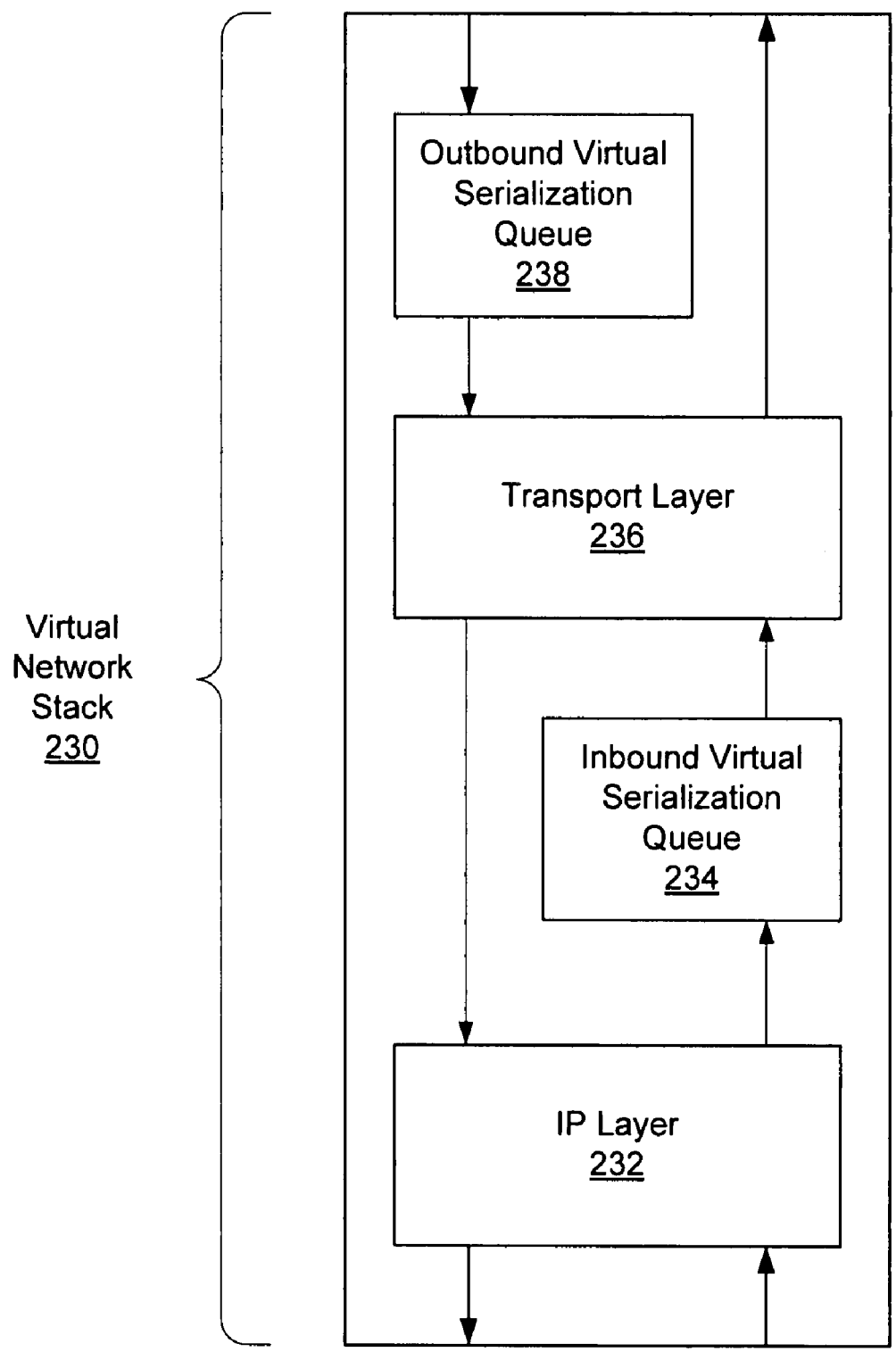
FIG. 2 shows a virtual network stack in accordance with one or more embodiments of the invention.

FIG. 2 shows a virtual network stack in accordance with one embodiment of the invention. In one embodiment of the invention, the virtual network stack (230) includes an Internet Protocol (IP) layer (232), an inbound virtual serialization queue (234), a transport layer (236), and an outbound virtual serialization queue (238). Each of the components is discussed below.

In one embodiment, the IP layer (232) is configured to receive packets from the virtual NIC associated with the virtual network stack (234). Further, the IP layer (232) is set up to receive packets from the transport layer (206). In one embodiment of the invention, the IP layer (232) is configured to perform IP level processing for both inbound and outbound packets. In one embodiment of the invention, the IP layer (232) is associated with a hardware (e.g., MAC) address to IP address mapping.

Continuing with the discussion of FIG. 2, the inbound virtual serialization queue (234) is configured to receive packets from the IP layer (232). The inbound virtual serialization queue (234) corresponds to a queue data structure which queues packets received from the IP layer (232) prior to the packets being processed by the transport layer (236). In one embodiment of the invention, the inbound virtual serialization queue (234) may be used to control the number of packets being received by the container associated with the virtual network stack (234). The inbound virtual serialization queue (234) may control the bandwidth by limiting the number of packets in the virtual serialization queue (234) and preventing additional packets from entering the virtual network stack (230) until the inbound virtual serialization queue (234) has less than a threshold number of packets. In one embodiment of the invention, the transport layer (236) is configured to process inbound and outbound packets in accordance with the Transmission Control Protocol (TCP) and/or User Datagram Protocol (UDP).

In one or more embodiments of the invention, the outbound virtual serialization queue (238) is a queue data structure for receiving packets from the container with which the virtual network stack (234) is associated. Further, the outbound virtual serialization queue (238) stores the packets prior to sending the received packets to the transport layer (236). In one embodiment of the invention, the outbound virtual serialization queue (238) is also able to control the flow of packets from the container associated with the virtual network stack (234) to the virtual network stack (234). In one embodiment of the invention, the outbound virtual serialization queue (238) (or a related process) may block the container from sending packets to the outbound virtual serialization queue (238) if the container attempts to issue packets at a higher rate than the outbound bandwidth allocated to the container. Further, the outbound virtual serialization queue (238) (or a related process) is configured to notify the container when it is no longer blocked from issuing packets to the virtual network stack (234).

In one or more embodiments of the invention, the inbound virtual serialization queue (234) and outbound virtual serialization queue (238) enforce the manner in which packets are processed. Specifically, the inbound virtual serialization queue (234) and outbound virtual serialization queue (238) may be configured to enforce the packet processing requirements imposed by the transport layer (236). For example, TCP requires serial processing of packets. Thus, the inbound virtual serialization queue (234) and outbound virtual serialization queue (238) may require all threads accessing the inbound virtual serialization queue (234) and outbound virtual serialization queue (238) to conform to a mutual exclusion policy. In one embodiment of the invention, the mutual exclusion policy may restrict access to the virtual serialization queue to one thread at a time. Thus, if two threads are attempting to access a given virtual serialization queue, one thread must wait until the other thread has finished accessing the virtual serialization queue.

Alternatively, if the transport layer (236) only supports UDP, then the inbound virtual serialization queue (234) and outbound virtual serialization queue (238) may allow concurrent access by multiple threads. In one embodiment of the invention, if the transport layer (236) is configured to process both TCP and UDP packets, then the inbound virtual serialization queue (234) and outbound virtual serialization queue (238) are set to conform to the more stringent standard (e.g., TCP if the transport layer supports both TCP and UDP).

Figure 3:
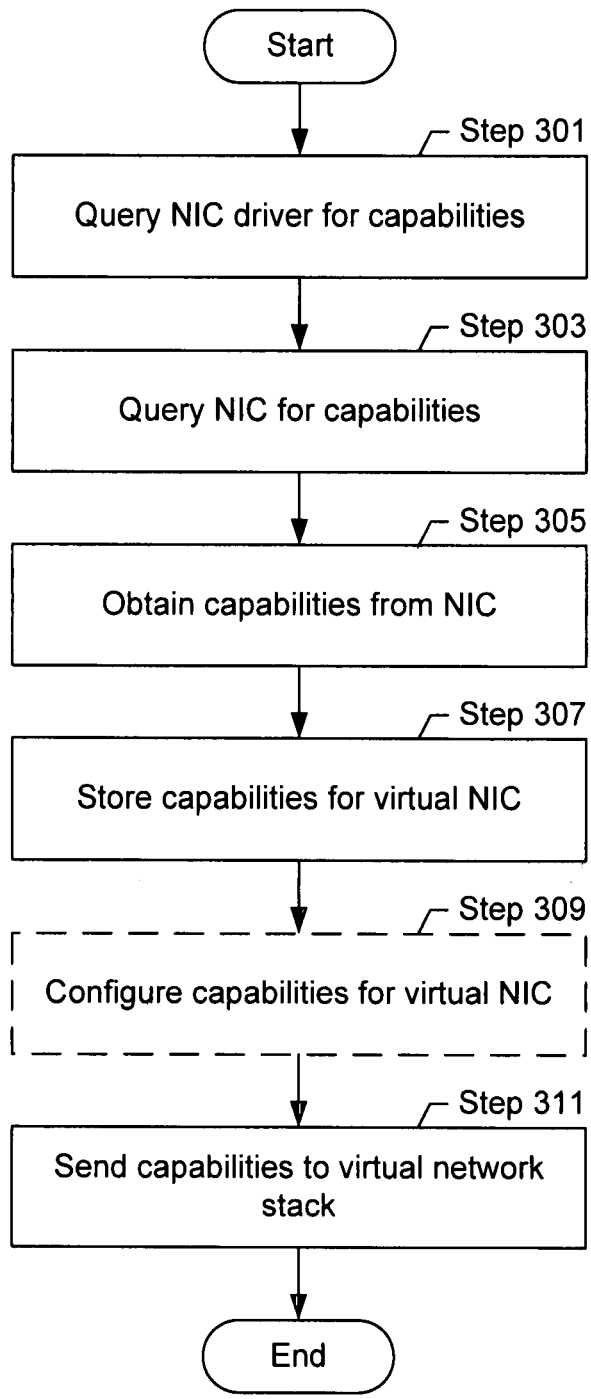
FIGS. 3-5 show flow diagrams in accordance with one or more embodiments of the invention.

FIG. 3 shows a flow diagram of NIC capability inheritance in accordance with one or more embodiments of the invention. In one or more embodiments of the invention, one or more of the steps described below may be omitted, repeated, and/or performed in a different order. Accordingly, the specific arrangement of steps shown in FIG. 3 should not be construed as limiting the scope of the invention.

Initially, a NIC driver is queried for capabilities (Step 301). The querying may be done by a host to obtain capabilities associated with a NIC. To do so, the host may query the NIC driver, which may serve as an interface between the host and the NIC. To obtain the capabilities for the host, the NIC driver queries the NIC (Step 303). For example, the capabilities may be stored in memory and/or firmware on the NIC. The capabilities may then be obtained by the NIC driver (Step 305) by accessing the memory and/or firmware. Once the capabilities are obtained, the capabilities may be stored in a cache of a MAC layer associated with the NIC. In addition, the capabilities may be configured for use by the host according to a global access policy. For example, each capability may be enabled or disabled on the NIC. Modes of operation may also be selected for each capability, as described above with respect to FIG. 1.

The capabilities may also be stored for a virtual NIC (Step 307). The capabilities may be stored in a virtual cache of a virtual MAC layer associated with the virtual NIC. Alternatively, the capabilities may be stored directly in the virtual NIC, just as the capabilities are stored in the NIC. The capabilities may also be configured for the virtual NIC (Step 309). As mentioned previously, the capabilities may be configured for the virtual NIC based on a local access policy. Configuration of capabilities for a virtual NIC is described in further detail below with respect to FIG. 4.

The capabilities are also sent to a virtual network stack (Step 311) associated with the virtual NIC. The capabilities may then be used by the virtual network stack to process incoming and outgoing packets. For example, if a cryptographic offload capability is enabled for a virtual NIC, the virtual network stack may use the cryptographic offload ability to encrypt and decrypt packets. Packet processing using NIC capabilities is explained in further detail below with respect to FIG. 5.

Figure 4:
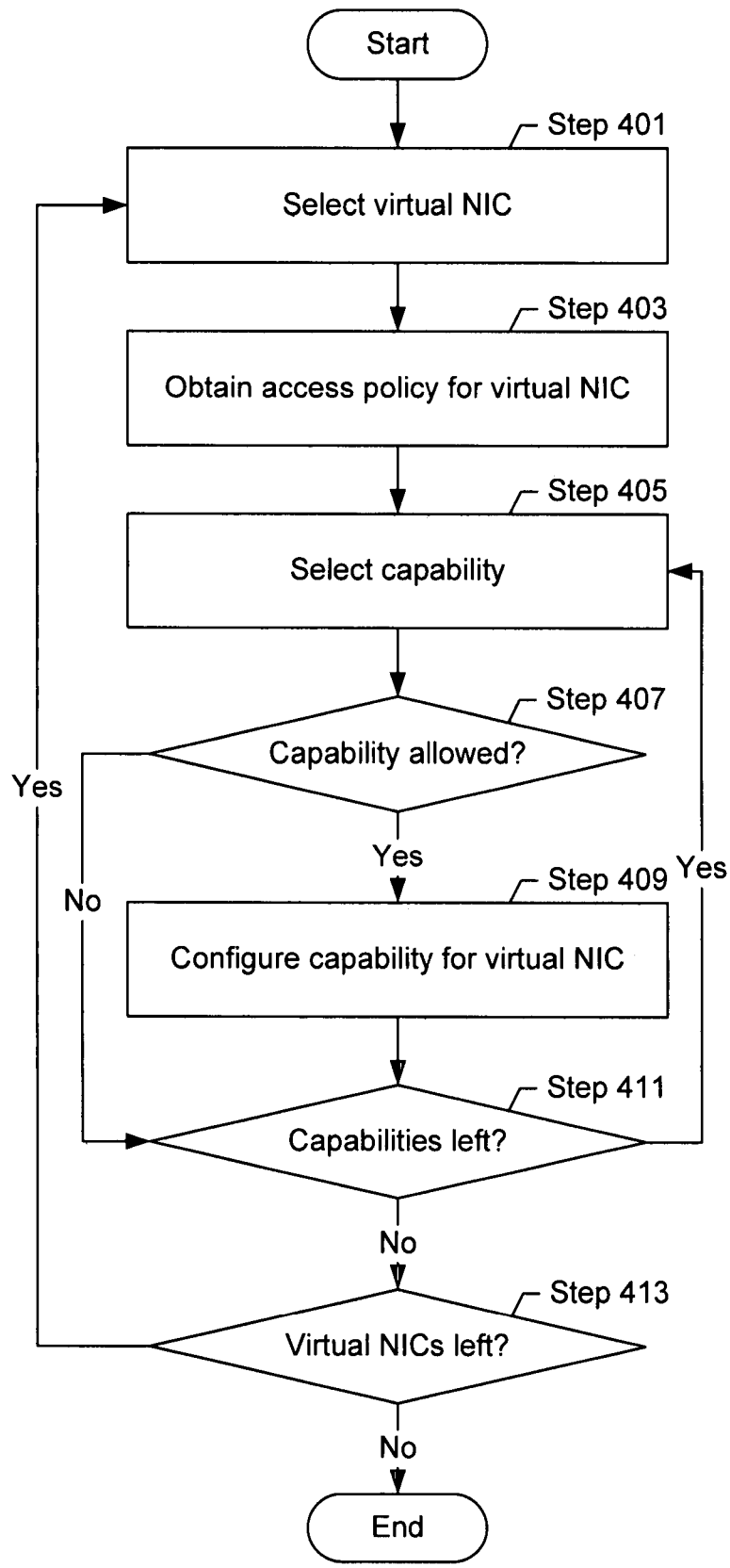

FIG. 4 shows a flow diagram of capability configuration in accordance with one or more embodiments of the invention. In one or more embodiments of the invention, one or more of the steps described below may be omitted, repeated, and/or performed in a different order. Accordingly, the specific arrangement of steps shown in FIG. 4 should not be construed as limiting the scope of the invention.

Initially, a virtual NIC is selected (Step 401). The virtual NIC may be one of multiple virtual NICs associated with a host. Further, the virtual NICs may share NIC capabilities according to one or more access policies. As a result, the capabilities may be configured for the virtual NIC according to an access policy (Step 403) obtained for the virtual NIC. As described above, the access policy may dictate a subset of NIC capabilities available for the virtual NIC. Further, the access policy may allocate a portion of each capability to the virtual NIC.

A capability is selected (Step 405) for configuration with respect to the virtual NIC. A determination is made regarding whether the capability is available for the virtual NIC (Step 407). For example, a global access policy may disable the capability for use by the host. In addition, a local access policy may disable the capability for use with respect to the virtual NIC. For example, the capability may be disabled for the virtual NIC if packet processing is required at the virtual network stack level instead of the NIC level. However, if the capability is allocated to the virtual NIC, the capability is configured for the virtual NIC (Step 409) according to the access policy. For example, if the capability available to the virtual NIC is a 50% allocation of the capability at the NIC level, 50% of packet processing using the NIC capability is reserved for the virtual NIC. Configuration may also include determining the way in which packets are processed using the capability. For example, if a cryptographic offload capability is enabled for the virtual NIC, configuring the cryptographic offload for the capability may include creating one or more security policies and/or security associations for packets associated with the virtual NIC.

A determination is made regarding whether any capabilities are left (Step 411) for configuration. If capabilities are left, each capability is selected (Step 405) and configured for the virtual NIC (Step 409), provided the capability is available for the virtual NIC (Step 407). A determination is also made regarding whether any virtual NICs are left which require configuration of NIC capabilities (Step 413). If so, a virtual NIC is selected (Step 401), and NIC capabilities are configured for the virtual NIC (Step 405-Step 411) according to an access policy (Step 403) for the virtual NIC. The process is repeated until NIC capabilities are configured for all virtual NICs on the system.

Figure 5:
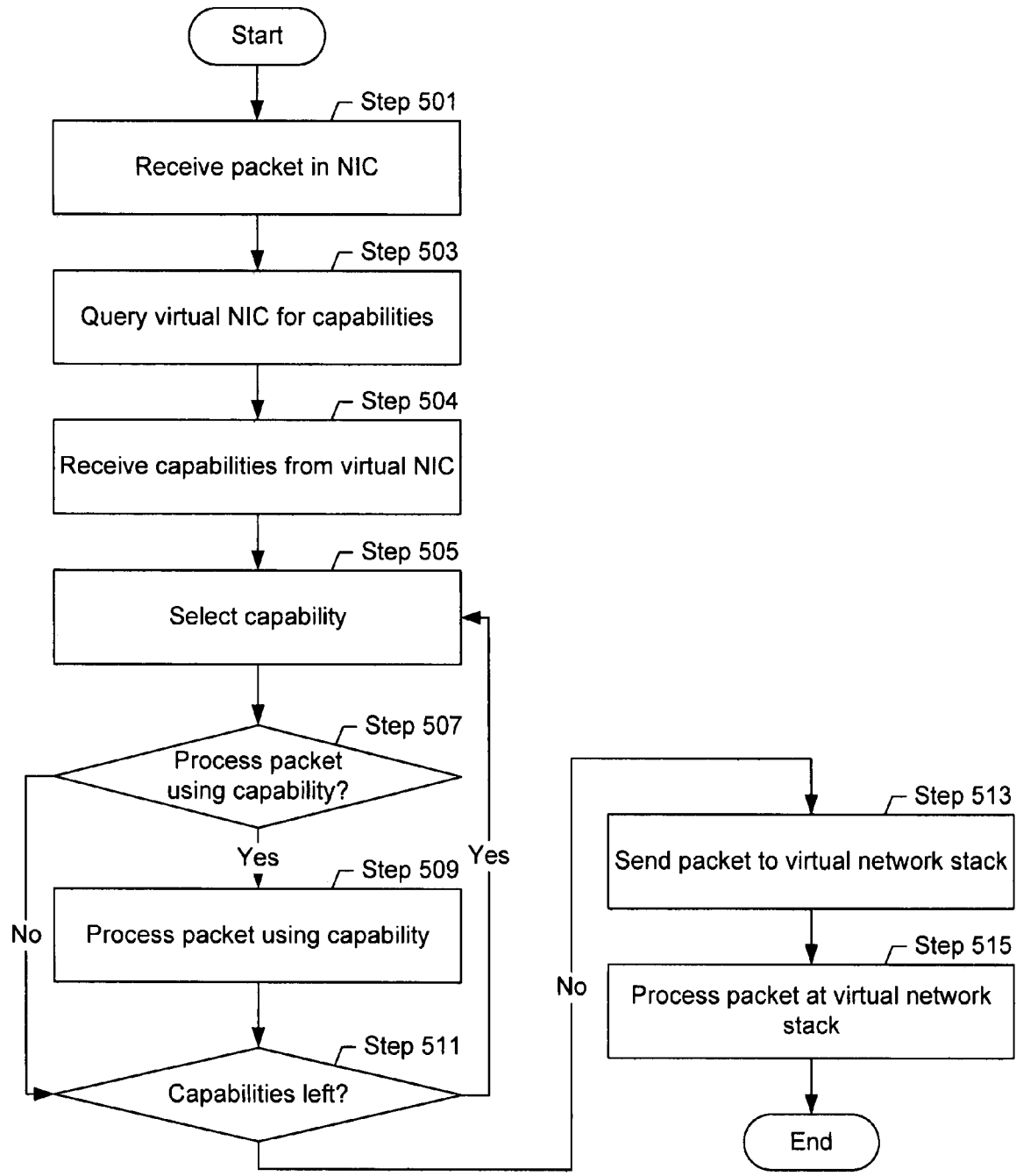

FIG. 5 shows a flow diagram of packet processing using NIC capabilities in accordance with one or more embodiments of the invention. In one or more embodiments of the invention, one or more of the steps described below may be omitted, repeated, and/or performed in a different order. Accordingly, the specific arrangement of steps shown in FIG. 5 should not be construed as limiting the scope of the invention.

Initially, a packet is received in a NIC (Step 501). Upon receipt, the packet may be placed in a receive ring of the NIC, as explained above with respect to FIG. 1. The receive ring may correspond to a virtual NIC, which is queried for available capabilities (Step 503). As stated above, the capabilities may be stored in a virtual MAC layer cache associated with the virtual NIC, or in the virtual NIC itself. The capabilities may then be received from the virtual NIC (Step 504), regardless of where the capabilities for the virtual NIC are stored.

An available capability is selected (Step 505) and a determination is made regarding whether the packet is to be processed using the capability (Step 507). In other words, the packet may not be processed using the capability if the packet does not require the capability for processing. For example, an unencrypted packet may not be processed using a cryptographic offload capability even if a portion of the cryptographic offload capability is allocated to the virtual NIC. Similarly, a packet may be processed using a virtual network stack associated with the virtual NIC even if a NIC capability that performs the same processing is available for packets associated with the virtual NIC. For example, an encrypted packet may be decrypted by a virtual network stack instead of the NIC because only the virtual network stack has access to the security associations for decrypting the packet. The packet is processed using the capability (Step 509) if use of the capability is available and the capability is configured for processing of the packet. In other words, the packet is processed using the capability if the packet meets all of the criteria (e.g., packet headers, protocols, etc.) for processing by the capability.

A determination is made regarding whether any capabilities are left to apply to the packet (Step 511). If capabilities are left, each capability is selected (Step 505) and a decision made regarding whether the packet is to be processed with the capability (Step 507). If so, the packet is processed using the capability (Step 509). If not, the next capability is selected (Step 505) until all available capabilities for the virtual NIC have been selected. The packet is sent to the virtual network stack (Step 513). At the virtual network stack, the packet is processed (Step 515), if any processing remains for the packet. As mentioned above, the packet may be processed by the virtual network stack even if the same processing may be accomplished using a NIC capability.

Figure 6:
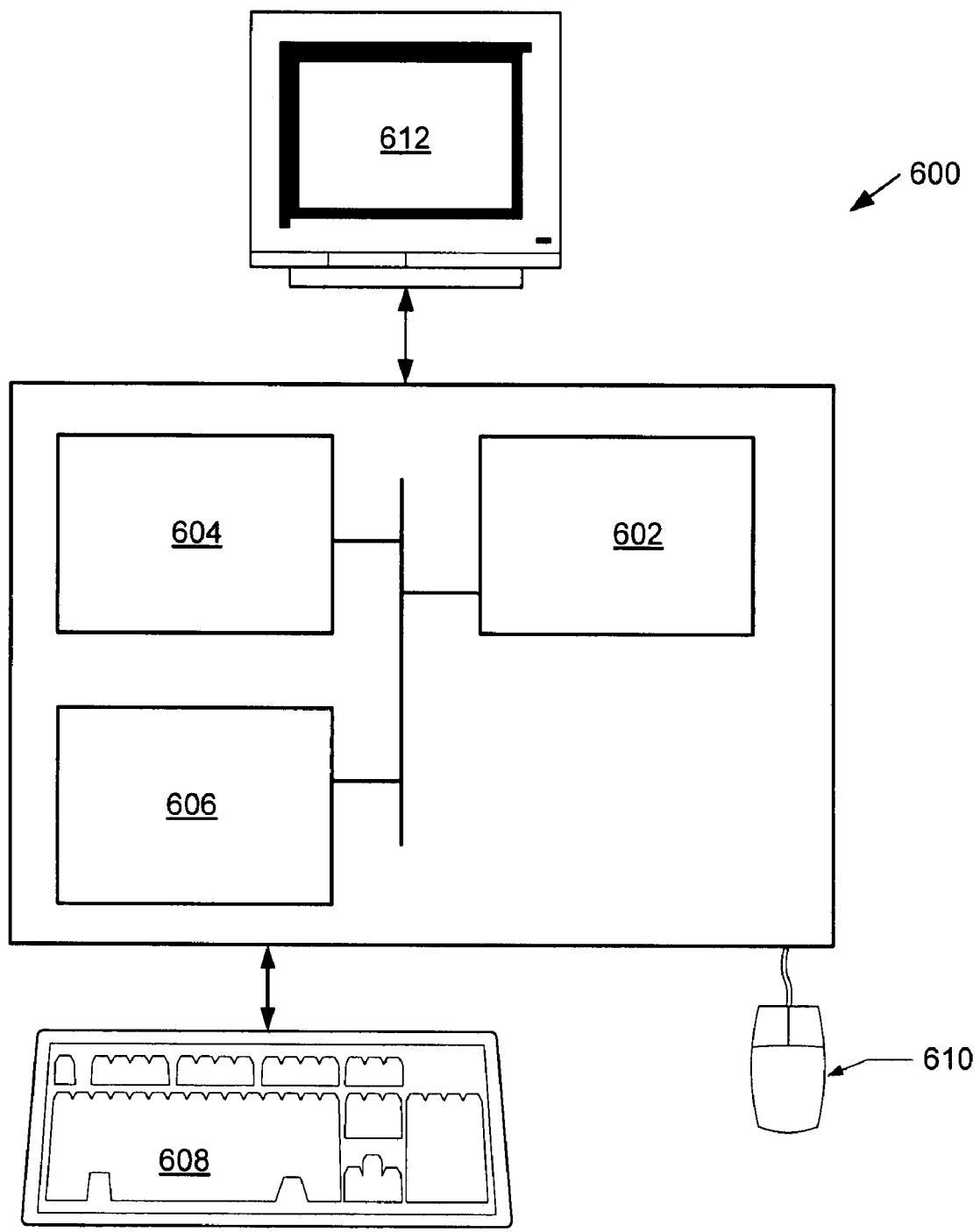
FIG. 6 shows a computer system in accordance with one or more embodiments of the invention.

The invention may be implemented on virtually any type of computer regardless of the platform being used. For example, as shown in FIG. 6, a computer system (600) includes a processor (602), associated memory (604), a storage device (606), and numerous other elements and functionalities typical of today's computers (not shown). The computer (600) may also include input means, such as a keyboard (608) and a mouse (610), and output means, such as a monitor (612). The computer system (600) is connected to a local area network (LAN) or a wide area network (e.g., the Internet) (not shown) via a network interface connection (not shown). Those skilled in the art will appreciate that these input and output means may take other forms.

Further, those skilled in the art will appreciate that one or more elements of the aforementioned computer system (600) may be located at a remote location and connected to the other elements over a network. Further, the invention may be implemented on a distributed system having a plurality of nodes, where each portion of the invention (e.g., NIC, virtual NICs, virtual network stacks, etc.) may be located on a different node within the distributed system. In one embodiment of the invention, the node corresponds to a computer system. Alternatively, the node may correspond to a processor with associated physical memory. The node may alternatively correspond to a processor with shared memory and/or resources. Further, software instructions to perform embodiments of the invention may be stored on a computer readable medium such as a compact disc (CD), a diskette, a tape, a file, or any other computer readable storage device.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for obtaining a capability from a physical network interface card (NIC), comprising:

sending a first query to the physical NIC for the capability, wherein the physical NIC is associated with a first set of capabilities;

obtaining the capability from the physical NIC in response to the first query;

sending the capability to a first virtual NIC, wherein the first virtual NIC is one of a plurality of virtual NICs associated with the physical NIC, wherein the first virtual NIC is associated with a second set of capabilities, wherein the second set of capabilities is a subset of the first set of capabilities, wherein the first virtual NIC is configured to access only capabilities in the second set of capabilities, and wherein the capability is in the second set of capabilities;

sending the capability from the first virtual NIC to a first virtual network stack associated with the first virtual NIC, wherein the first virtual NIC is operatively connected to a first non-global container by the first virtual network stack, wherein the first non-global container is one of a plurality of non-global containers associated with a common operating system kernel, wherein each one of the plurality of non-global containers is an isolated execution environment, wherein the capability is used by the first virtual network stack to process first packets, and wherein the first packets are sent and received by the first non-global container using the first virtual NIC;

sending a second query to the physical NIC for the capability;

obtaining the capability from the physical NIC in response to the second query;

sending the capability to a second virtual NIC, wherein the second virtual NIC is one of the plurality of virtual NICs associated with the physical NIC, wherein the virtual NIC is associated with a third set of capabilities, wherein the third set of capabilities is a subset of the first set of capabilities, wherein the second virtual NIC is configured to access only capabilities in the third set of capabilities, and wherein the capability is in the third set of capabilities; and sending the capability from the second virtual NIC to a second virtual network stack associated with the second virtual NIC, wherein the second virtual NIC is operatively connected to a second non-global container by the second virtual network stack, and wherein the second non-global container is one of the plurality of non-global containers associated with the common operating system kernel, wherein the capability is used by the second virtual network stack to process second packets, and wherein the second packets are sent and received by the second non-global container using the second virtual NIC.

2. The method of claim 1, further comprising:
configuring the capability for the first virtual NIC.

3. The method of claim 2, wherein configuring the capability comprises exposing only a portion of the capability to the first virtual NIC.

4. The method of claim 2, wherein the capability is configured using a Media Access Control (MAC) layer management module located in a host operatively connected to the physical NIC.

5. The method of claim 2, wherein the capability is configured based on an access policy, wherein the access policy is at least one selected from a global access policy implemented by a global container and a local access policy implemented by the first non-global container in which the first virtual NIC is located.

6. The method of claim 2, wherein configuring the capability comprises using a global access policy to determine whether the capability is available to the first virtual NIC.

7. The method of claim 1, wherein the capability is stored in a cache reserved for the first virtual NIC.

8. The method of claim 1, wherein the capability is at least one selected from a group consisting of a hardware offloading capability, a cryptographic offloading capability, a transport protocol offload engine, an extensible markup language (XML) parser, a security protocol algorithm, a large send offloading (LSO) capability, a large receive offload (LRO) capability, and a hardware checksum capability.

9. The method of claim 1, wherein the second set of capabilities and the third set of capabilities comprise at least one common capability.

10. A system for processing packets, comprising:

a physical network interface card (NIC) comprising a first set of capabilities;

a host operatively connected to the physical NIC using a NIC driver, comprising:

a first virtual NIC, wherein the first virtual NIC is one of a plurality of virtual NICs associated with the physical NIC, wherein the first virtual NIC receives a capability from the physical NIC in response to a first query sent by the first virtual NIC, wherein the first virtual NIC receives a second set of capabilities from the physical NIC using the NIC driver, wherein the second set of capabilities is a subset of the first set of capabilities, wherein the first virtual NIC is configured to access only capabilities in the second set of capabilities, and wherein the capability is in the second set of capabilities; and a first virtual network stack operatively connected to the first virtual NIC, wherein the first virtual NIC is operatively connected to a first non-global container by the first virtual network stack, wherein the first non-global container is one of a plurality of non-global containers associated with a common operating system kernel, wherein each one of the plurality of non-global containers is an isolated execution environment, wherein the first virtual network stack receives the second set of capabilities from the first virtual NIC, wherein the second set of capabilities is configured in the first virtual NIC, wherein the first virtual network stack uses the capability to process first packets received by the host, and wherein the first packets are sent and received by the first non-global container using the first virtual NIC;

a second virtual NIC, wherein the second virtual NIC is one of the plurality of virtual NICs associated with the physical NIC, wherein the second virtual NIC receives the capability from the physical NIC in response to a second query sent by the second virtual NIC, wherein the second virtual NIC receives a third set of capabilities from the physical NIC using the NIC driver, wherein the capability is in the third set of capabilities, and wherein the third set of capabilities is a subset of the first set of capabilities; and a second virtual network stack operatively connected to the second virtual NIC, wherein the second virtual NIC is operatively connected to a second non-global container by the second virtual network stack, wherein the second virtual network stack receives the third set of capabilities from the second virtual NIC, wherein the third set of capabilities is configured in the second virtual NIC, wherein the second virtual network stack uses the capability to process second packets, and wherein the second packets are sent and received by the second non-global container using the second virtual NIC.

11. The system of claim 10, wherein the second set of capabilities and the third set of capabilities comprise at least one common capability.

12. The system of claim 10, wherein the host further comprises:

a Media Access Control (MAC) layer associated with the physical NIC; and a MAC layer management module, wherein the second set of capabilities is configured by the MAC layer management module.

13. The system of claim 12, wherein the second set of capabilities is configured based on an access policy, wherein the access policy is at least one selected from a global access policy implemented by a global container and a local access policy implemented by the first non-global container in which the first virtual NIC is located.

14. The system of claim 10, wherein the second set of capabilities is stored in a cache reserved for the first virtual NIC.

15. The system of claim 10, wherein the second set of capabilities is configured in the first virtual NIC using a local access policy and wherein the local access policy defines how to configure at least one of capabilities in the second set of capabilities for the first virtual NIC.

16. The system of claim 10, wherein the first set of capabilities comprise at least one selected from a group consisting of a hardware offloading capability, a cryptographic offloading capability, a transport protocol offload engine, an extensible markup language (XML) parser, a security protocol algorithm, a large send offloading (LSO) capability, a large receive offload (LRO) capability, and a hardware checksum capability.

17. A non-transitory computer readable medium containing software instructions embodied therein for causing a computer system to perform a method for obtaining a capability from a physical network interface card (NIC), the method comprising:

sending a query to the physical NIC for the capability, wherein the physical NIC is associated with a first set of capabilities;

obtaining the capability from the physical NIC in response to the query;

sending the capability to a first virtual NIC, wherein the first virtual NIC is one of a plurality of virtual NICs associated with the physical NIC, wherein the first virtual NIC is associated with a second set of capabilities, wherein the second set of capabilities is a subset of the first set of capabilities, wherein the first virtual NIC is configured to access only capabilities in the second set of capabilities, and wherein the capability is in the second set of capabilities;

sending the capability from the first virtual NIC to a first virtual network stack associated with the first virtual NIC, wherein the first virtual NIC is operatively connected to a first non-global container by the first virtual network stack, wherein the first non-global container is one of a plurality of non-global containers associated with a common operating system kernel, wherein each one of the plurality of non-global containers is an isolated execution environment, wherein the capability is used by the first virtual network stack to process first packets, and wherein the first packets are sent and received by the first non-global container using the first virtual NIC;

sending a second query to the physical NIC for the capability;

obtaining the capability from the physical NIC in response to the second query;

sending the capability to a second virtual NIC, wherein the second virtual NIC is one of the plurality of virtual NICs associated with the physical NIC, wherein the virtual NIC is associated with a third set of capabilities, wherein the third set of capabilities is a subset of the first set of capabilities, wherein the second virtual NIC can only access capabilities in the third set of capabilities, and wherein the capability is in the third set of capabilities; and sending the capability from the second virtual NIC to a second virtual network stack associated with the second virtual NIC, wherein the second virtual NIC is operatively connected to a second non-global container by the second virtual network stack, and wherein the second non-global container is one of the plurality of non-global containers associated with the common operating system kernel, and wherein the capability is used by the second virtual network stack to process second packets, and wherein the second packets are sent and received by the second non-global container using the second virtual NIC.

18. The non-transitory computer readable medium of claim 17, wherein the capability is configured based on an access policy, wherein the access policy is at least one selected from a global access policy implemented by a global container and a local access policy implemented by the first non-global container in which the first virtual NIC is located.

19. The non-transitory computer readable medium of claim 17, wherein configuring the capability comprises exposing a portion of the capability to the first virtual network stack.

20. The non-transitory computer readable medium of claim 17, wherein the capability is at least one selected from a group consisting of a hardware offloading capability, a cryptographic offloading capability, a transport protocol offload engine, an extensible markup language (XML) parser, a security protocol algorithm, a large send offloading (LSO) capability, a large receive offload (LRO) capability, and a hardware checksum capability.

* * * * *